Aug. 31, 1926.  
J. SKOWRON  
1,598,020
SAW SHARPENING DEVICE
Filed Nov. 18, 1924
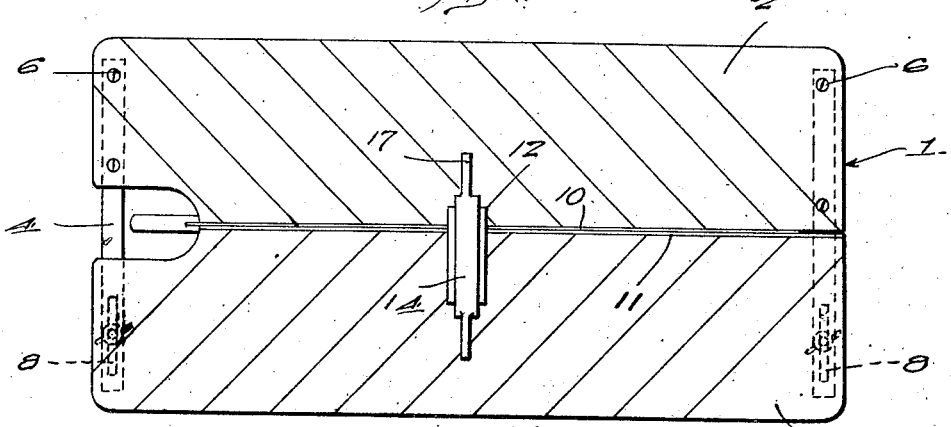
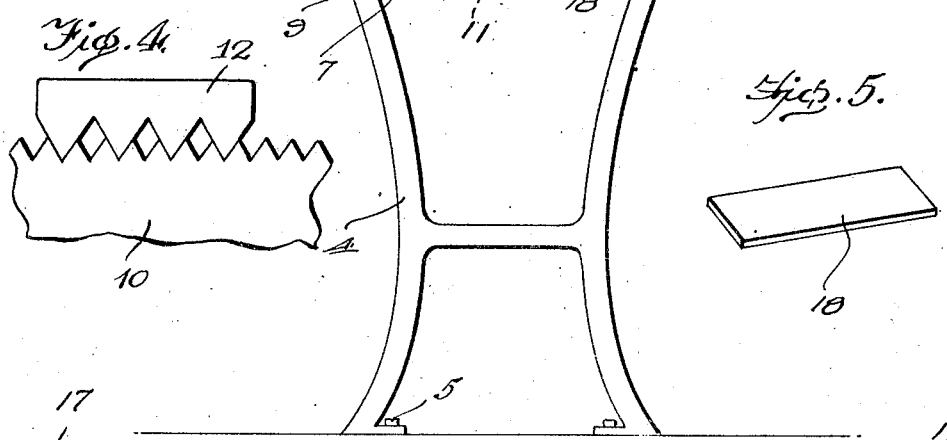
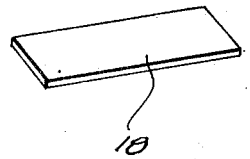
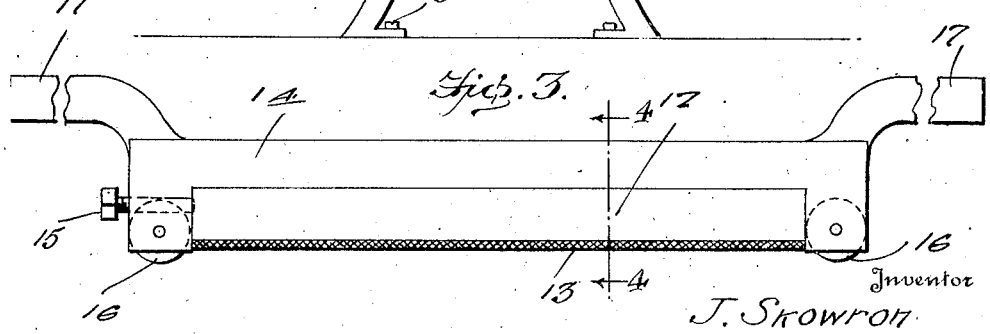
Inventor  
J. Skowron
By Clarence A. O'Brien  
Attorney Patented Aug. 31, 1926.

1,598,020

UNITED STATES PATENT OFFICE.

JOHN SKOWRON, OF LOS ANGELES, CALIFORNIA, ASSIGNOR OF ONE-HALF TO JOHN OSMOLA, OF LOS ANGELES, CALIFORNIA.

SAW-SHARPENING DEVICE.

Application filed November 18, 1924. Serial No. 750,581.

This invention relates to improvements in saw sharpening devices and has for its principal object to provide a simple and efficient means for supporting a saw blade in such a manner as to permit the saw teeth to be easily and efficiently sharpened.

Another important object of the invention is to provide a saw sharpening device of the above mentioned character, which includes a table for supporting a saw in an upright position, the sharpening means for the teeth of the saw being supported in a carriage adapted for reciprocatory movement on the table over the saw.

A further object of the invention is to provide a saw sharpening device of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a top plan view of the saw sharpening device embodying my invention.

Figure 2 is an end elevation.

Figure 3 is a side elevation of the file carriage.

Figure 4 is a sectional view taken approximately on line 4—4 of Figure 3, and

Figure 5 is a detail perspective view of one of the gage strips.

In the drawing wherein for the purpose of illustration is shown the preferred embodiment of my invention, the numeral 1 designates generally the saw supporting table and the same comprises the complementary sections 2 and 3 which are supported at their ends on the standards 4, the latter being secured to the floor as at 5. The section 2 of the table is rigidly secured on the standards 4 by means of the fastening screws 6. The complementary section 3 is adapted for slidable movement on the standards and to this end, the section 3 carries the bolts 7 at the ends thereof, the same being adapted to extend through suitable slots shown at 8 provided in the standards and receiving the locking thumb nut 9 for holding the section 3 in the desired adjusted position with respect to the stationary section 2.

The purpose of this construction is to permit the blade of a saw 10 to be placed between the adjacent longitudinal edges of the complementary sections for clamping the blade in an upright position so that the teeth of the saw will extend above the upper surface of the table. To prevent the jarring of the saw blade when in position between the complementary sections, I provide a rubber strip 11 which is disposed in the longitudinal slot provided therefor in the inner edge of the section 3. The manner in which the rubber strip 11 engages the saw blade 10 is more clearly illustrated in Figure 2 of the drawing.

The saw sharpening device comprises a file member 12, the cutting teeth of which are illustrated at 13 and as clearly illustrated in Figure 4, the file is of considerable width. The file 12 is adapted to be adjustably supported within the wheeled carriage 14 by means of the set screw 15 which extends through one end of the carriage and engages the adjacent end of the file, the other end of the file being forced into engagement with the opposite end of the wheeled carriage. The wheels of the carriage 14 are illustrated at 16, the same being arranged at the respective ends of the carriage. Suitable handles 17 are also provided at the ends of the carriage for facilitating the moving of the carriage across the upper surface of the table when the saw teeth are being sharpened.

For the purpose of gaging the depth at which the saw teeth are to be sharpened, I employ the gage strip 18 which is adapted to be placed on the table under the forward wheels of the carriage. Assuming that a single gage plate is used, I would call attention to the fact that one end portion of the saw blade is raised upwardly about the surface of the table so that the bottoms of the pockets between the teeth are on a plane above the top surface of the gage strip. The opposite end of the blade is also adjusted in this manner so that the teeth project above the top surface of the gage plate. It will be noted, however, the saw blade is not firmly clamped at this time but is simply loosely clamped. Then the carriage is disposed across the central portion of the saw blade as represented in the drawings and one wheel is disposed over the gage strip. Then this raised end portion of the carriage is forced downwardly, pressing the saw blade downwardly between the clamping faces of the table section until the roller comes into contact with the gage strip. Then the gage strip is removed, permitting one end of the carriage and the sharpening member to be supported in an inclined position on the saw blade and above the table. Now by reciprocating the carriage it is obvious that the cut can be made until the raised end of the carriage comes down into engagement with the complementary section of the table. In this way the depths of the cuts may be accurately gaged and it is obvious that either one or two of the gage strips may be employed as circumstances require.

If the saw is not very dull, only one gage is to be used. If however, the saw is very dull, then two gages must be used so that the saw teeth may be properly sharpened.

The use of a saw shapening device of the above mentioned character, will save considerable time and labor and the parts are further so arranged as to permit the same to be readily adjusted.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

In a structure of the class described, a saw supporting table comprising a pair of inverted U-shaped standards, the bight portions of which are substantially straight, a top connected with said straight bight portions, said top being composed of a pair of sections having flat upper surfaces, one of said sections being rigidly connected with the standards and the other section being slidably connected, whereby to permit a saw blade to be clamped between the inner opposed edges of said sections, said sections being notched at one end adjacent one of said standards.

In testimony whereof I affix my signature.

JOHN SKOWRON.